(12) United States Patent
Charraud et al.

(10) Patent No.: US 10,943,394 B2
(45) Date of Patent: Mar. 9, 2021

(54) SYSTEM THAT GENERATES A THREE-DIMENSIONAL BEAUTY ASSESSMENT THAT INCLUDES REGION SPECIFIC SENSOR DATA AND RECOMMENDED COURSES OF ACTION

(71) Applicant: L'Oreal, Paris (FR)

(72) Inventors: Gregoire Charraud, Levallois-Perret (FR); Helga Malaprade, Vincennes (FR); Guive Balooch, New York, NY (US)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 16/137,614

(22) Filed: Sep. 21, 2018

(65) Prior Publication Data
US 2020/0098174 A1   Mar. 26, 2020

(51) Int. Cl.
| | | |
|---|---|---|
| *G06T 19/00* | (2011.01) | |
| *G06T 7/00* | (2017.01) | |
| *G06T 7/70* | (2017.01) | |
| *A45D 20/12* | (2006.01) | |
| *A46B 9/02* | (2006.01) | |
| *A45D 1/04* | (2006.01) | |
| *A45D 44/00* | (2006.01) | |
| *G06T 7/20* | (2017.01) | |
| *G06K 9/32* | (2006.01) | |

(52) U.S. Cl.
CPC ............. *G06T 19/00* (2013.01); *A45D 1/04* (2013.01); *A45D 20/12* (2013.01); *A45D 44/005* (2013.01); *A46B 9/023* (2013.01); *G06T 7/0012* (2013.01); *G06T 7/70* (2017.01); *A46B 2200/104* (2013.01); *G06K 9/3233* (2013.01); *G06T 7/20* (2013.01); *G06T 2207/20081* (2013.01); *G06T 2207/30088* (2013.01); *G06T 2207/30196* (2013.01); *G06T 2219/004* (2013.01)

(58) Field of Classification Search
CPC .. G06T 19/00; G06T 7/70; A45D 1/04; A45D 20/12
See application file for complete search history.

(56) References Cited

U.S. PATENT DOCUMENTS 9,814,297 B1\* 11/2017 Staton ................. A45D 44/005
2010/0185064 A1\* 7/2010 Bandic ................ A61B 5/0059
600/306

(Continued)

OTHER PUBLICATIONS

Jang, In-Su, et al. "Spectrum-Based Color Reproduction Algorithm for Makeup Simulation of 3D Facial Avatar." ETRI Journal 35.6 (2013): 969-979.\*

*Primary Examiner* — Sarah Lhymn
(74) *Attorney, Agent, or Firm* — Oblon, McClelland, Maier & Neustadt, L.L.P.

(57) ABSTRACT

A system is providing that includes processing circuitry configured to receive information of a specific sensed condition of a body part of a user detected by the at least one sensor of a device during a session, receive information of a tracked location of the device from a location tracker during the session, associate a specific time when the specific sensed condition is detected with a location of the device in space at the specific time, and determine a location on the body part in a three-dimensional virtual environment where the specific sensed condition occurs based on the associated specific time and location of the device.

8 Claims, 17 Drawing Sheets

T=0

(56) References Cited

U.S. PATENT DOCUMENTS

| | | | |
|---|---|---|---|
| 2014/0031668 A1* | 1/2014 | Mobasser | A61B 5/0075 600/409 |
| 2016/0143422 A1* | 5/2016 | Yamanashi | G06T 11/001 345/634 |
| 2016/0277649 A1* | 9/2016 | Taran Katz | H01R 25/00 |
| 2017/0256084 A1* | 9/2017 | Iglehart | G06K 9/00221 |
| 2019/0053608 A1* | 2/2019 | Staton | A45D 44/005 |

\* cited by examiner

T=N

T=0

Placeholder for Examples of digital file formats

| Timestamp (ms) | Accelerometer | | | Gyroscope | | | Magnetic compass | | | Sensors Measurement | | | 3D coordinates | | To be displayed |
|---|---|---|---|---|---|---|---|---|---|---|---|---|---|---|---|
| | Acc X | Acc Y | Acc Z | Gyr X | Gyr Y | Gyr Z | Mgnt X | Mgnt Y | Mgnt Z | Raw sensor 1 | Raw sensor 2 | Raw sensor 3 | XYZ | XnYnZn 3D normal | |
| T0 = 000000 | 0 | 0 | 0 | 0 | 0 | 0 | 0 | 0 | 0 | 0xxx | xxxx | xxx | 0 | 0 | Yes |
| 1 ms | | | | | | | | | | | | | | | No |
| 2 ms | | | | | | | | | | | | | | | Yes |
| ... | | | | | | | | | | | | | | | Yes |
| ... | | | | | | | | | | | | | | | No |

# SYSTEM THAT GENERATES A THREE-DIMENSIONAL BEAUTY ASSESSMENT THAT INCLUDES REGION SPECIFIC SENSOR DATA AND RECOMMENDED COURSES OF ACTION

BACKGROUND

Field of Invention

The present application relates to a system for tracking a location of a sensed condition on a user based on information from a sensor of a styling tool and a tracked location in space during a sensing operation, for reconstructing the sensed condition on a user's head in a virtual three-dimensional environment, and for utilizing the three-dimensional reconstruction for providing feedback to a display of the user or for controlling a connected styling tool based on the sensed condition.

SUMMARY

In an embodiment, a system and method is provided where processing circuitry is configured to receive information of a specific sensed condition of a body part of a user detected by the at least one sensor of a device during a session, receive information of a tracked location of the device from a location tracker during the session, associate a specific time when the specific sensed condition is detected with a location of the device in space at the specific time, and determine a location on the body part in a three-dimensional virtual environment where the specific sensed condition occurs based on the associated specific time and location of the device.

In an embodiment, the processing circuitry is configured to generate a digital file having a predetermined file format which associates the specific sensed condition to the three-dimensional virtual environment.

In an embodiment, the predetermined file format includes at least one of a timestamp field, accelerometer coordinate fields, gyroscope fields, magnetic compass fields, sensor measurement fields, 3D coordinate fields, 3D normal fields, and a field for indicating if entries corresponding to a particular timestamp represent an area of interest to be displayed.

In an embodiment, the processing circuitry is configured to output the digital file to a display device for generating a display of the three-dimensional virtual environment.

In an embodiment, the display of the three-dimensional virtual environment depicts the specific sensed condition on a three-dimensional representation of the user.

In an embodiment, the processing circuitry is configured to generate a digital recipe based on the digital file for controlling a device to treat the sensed condition, and transmit the digital recipe to the styling tool.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 12 shows examples of different digital file formats created based on the 3D reconstruction algorithm according to an embodiment.

DETAILED DESCRIPTION

Figure 1:
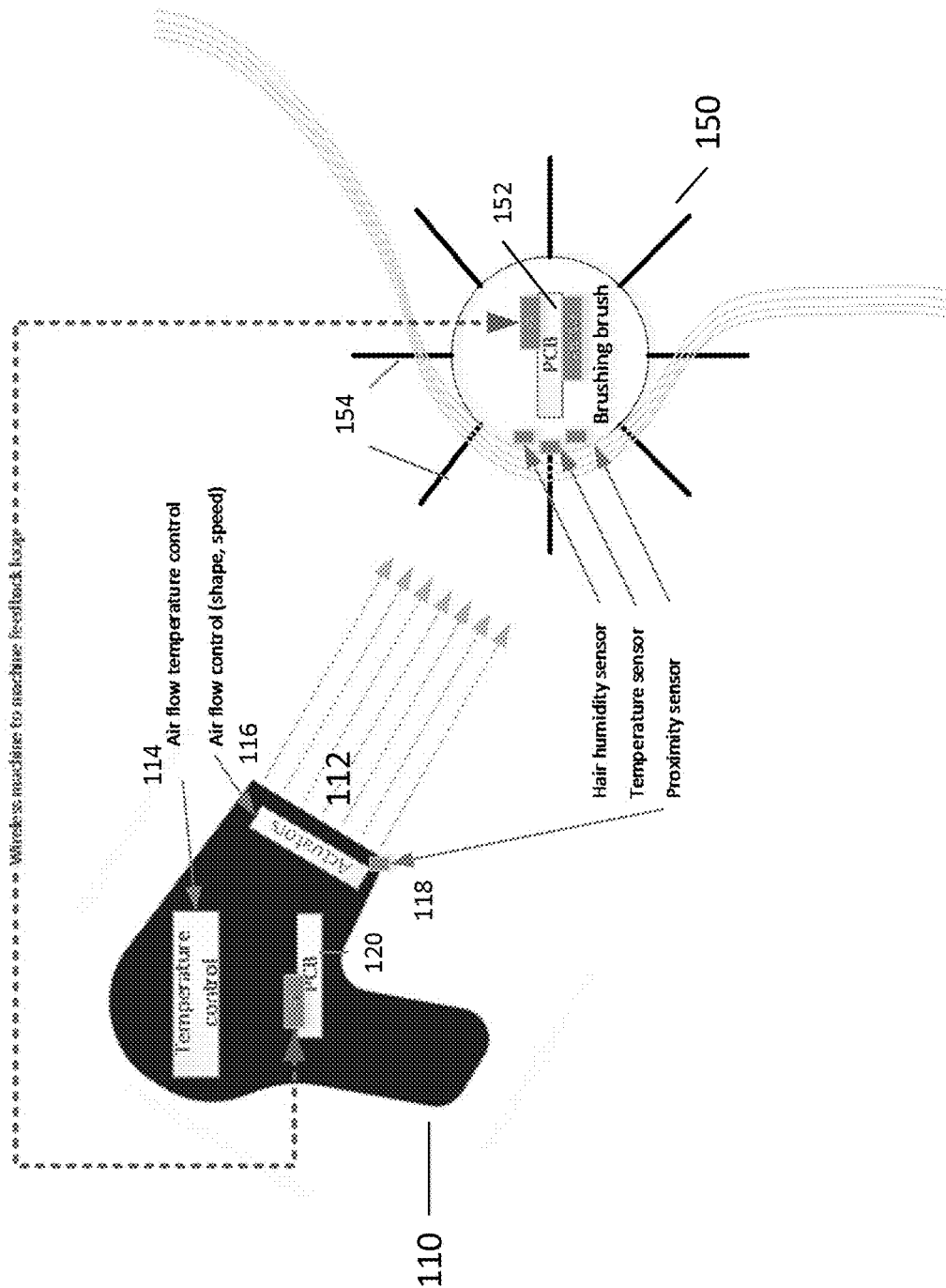
FIG. 1 shows a feedback system for sensing a characteristic of a user.

FIG. 1 shows feedback system 100 which is currently described in co-pending U.S. application Ser. No. 15/721,286, incorporated herein by reference. The system 100 includes a hair dryer device 110 and a brush device 150. The hair dryer 110 performs the functionality of a conventional hair dryer, such as generating and emitting hot air from outlet 112. The brush 150 includes bristles 154, which are disposed around the axis of the brush (a "round" hairbrush type). However, additional known hairbrush types may be used as well.

Additionally, the hair dryer device 110 and the brush device 150 include additional components. For instance, the hair dryer device 110 further includes a temperature controller 114 and actuators 116. The temperature controller 114 controls and adjusts the temperature of the air emitted by the hair dryer. The actuators control a shape of a pattern of air flow and the speed of air flow. The actuators may be mobile mechanical parts that could be moved in the air flow to modify its shape. The hair dryer may further include a proximity sensor 118 preferably disposed near the outlet 112 of the hair dryer. The proximity sensor may be an optical sensor, such as an infrared sensor, which is understood in the art. However other examples may be employed as well, such as a capacitive, ultrasonic, or Doppler sensors.

The hair dryer device 110 is configured to vary at least one setting at the hair dryer based on the received sensed characteristic. In an embodiment, the hair dryer device 110 is configured to dynamically modulate at least one setting at the hair dryer based on the received sensed characteristic.

The brush device may further include its own PCB 180 that includes communication and control circuitry such as a wireless RF communication interface for performing wireless communication with an external device (such as hair dryer 150). The PCB may further hold a motion detector, such as an accelerator/gyrometer.

The brush device also may include a hair humidity sensor and a temperature sensor. Hair and humidity sensors are known and understood in the art.

As depicted in FIG. 1, there may be a wireless machine-to-machine feedback loop between the brush device 150 and the hair dryer 110, facilitated by communication between the wireless RF communication interface embedded in each device. In such a feedback loop, the brush can sense the temperature when the hair dryer is operational and the humidity level of the user's hair and provide such feedback to the hair dryer. Based on this information, the hair dryer may adjust the temperature and/or the shape and/or speed of the air flow, by for example, adjusting the resistance of the heating element in the hair dryer, adjusting the fan speed, and/or adjusting the shape of the mechanical elements which control the air flow shape.

Therefore, in the conventional art, there may be a hairbrush and/or hair dryer that can sense a characteristic at the user's hair for causing adjustments directly at the hair dryer. However, what is needed is the ability to determine the specific location of the sensed condition on the user so that it may be reconstructed in a virtual three-dimensional environment for feedback to the user and to provide more precise control and adjustments to a styling tool when treating the user's hair in the future or even in real time.

Accordingly, one objective of the system is to fusion styling tool sensors samples with a spatial position on a representation of the user in 3D. A system according to an embodiment, may be composed of:

a styling tool or a diagnosis tool for skin and/or hair, a dongle or built-in accelerometer/gyroscope/magnetic compass recording acceleration, angular speed and magnetic field, the 3D position system can be completed by a vision system with a camera and/or proximity sensor based on infrared or ultrasonic method, a dedicated user experience depending of the tool, and and 3D reconstruction algorithms, The system is able to determine in real time the position and the orientation of the tool on the user's head or another part of the user's body depending on the type of tool being used.

By syncing temporal measurement of sensors as microphone, camera, conductance, force etc. with the 3D position recorded by motion/spatial tracking tools (such as an accelerometer, gyroscope, and/or compass) it enables the system to reconstruct, in 3D, the detected condition on the user.

Another objective of the system is to utilize a digital format to normalize and combine different kind of measurements on the same scale.

Each smart styling tool or diagnosis tool has specific sensors built-in:

a connected hair brush may include a microphone to listen to hair damage, force sensors, conductivity a styling iron may sense temperature and humidity, hair conductance, contact duration and total energy applied on hair.

a camera diagnosis tool: microscopic images of skin/hair features, hydration with image processing capability under different wavelengths lighting.

Adding a 3D positioning system and syncing the sensor measurement with these tools positions, a generic file format can be created to combine the measurement and localize it on user body surface.

This file format should have a least following:

Physical starting point and user body specified by the user experience

Precise timestamp fitting with sampling frequency of sensors to ensure syncing

Data format and units of sensors has to be specified for proper computing

Number and type of sensors

Specific user actions

User's Body area recorded to reconstruct 3D display

Context information and non-exclusively: timezone, geo-localization, weather, temperature, version This generic digital file format standard enables to unify all kinds of measurements on the same spatial reference for a more precise analysis.

Figure 2:
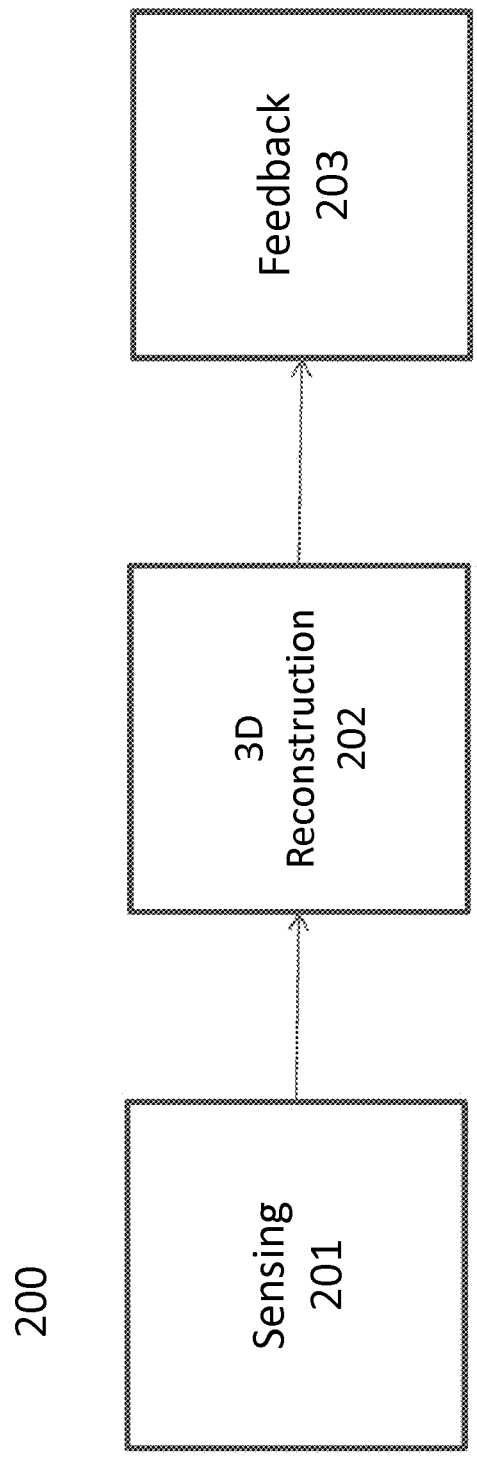
FIG. 2 shows components of an overall system according to an embodiment.

FIG. 2 shows components of an overall system 200 according to an embodiment. The system is broadly depicted as including a sensing component 201, a 3D reconstruction component 202, and a feedback component 203, each of which will be described in detail below.

Figure 3:
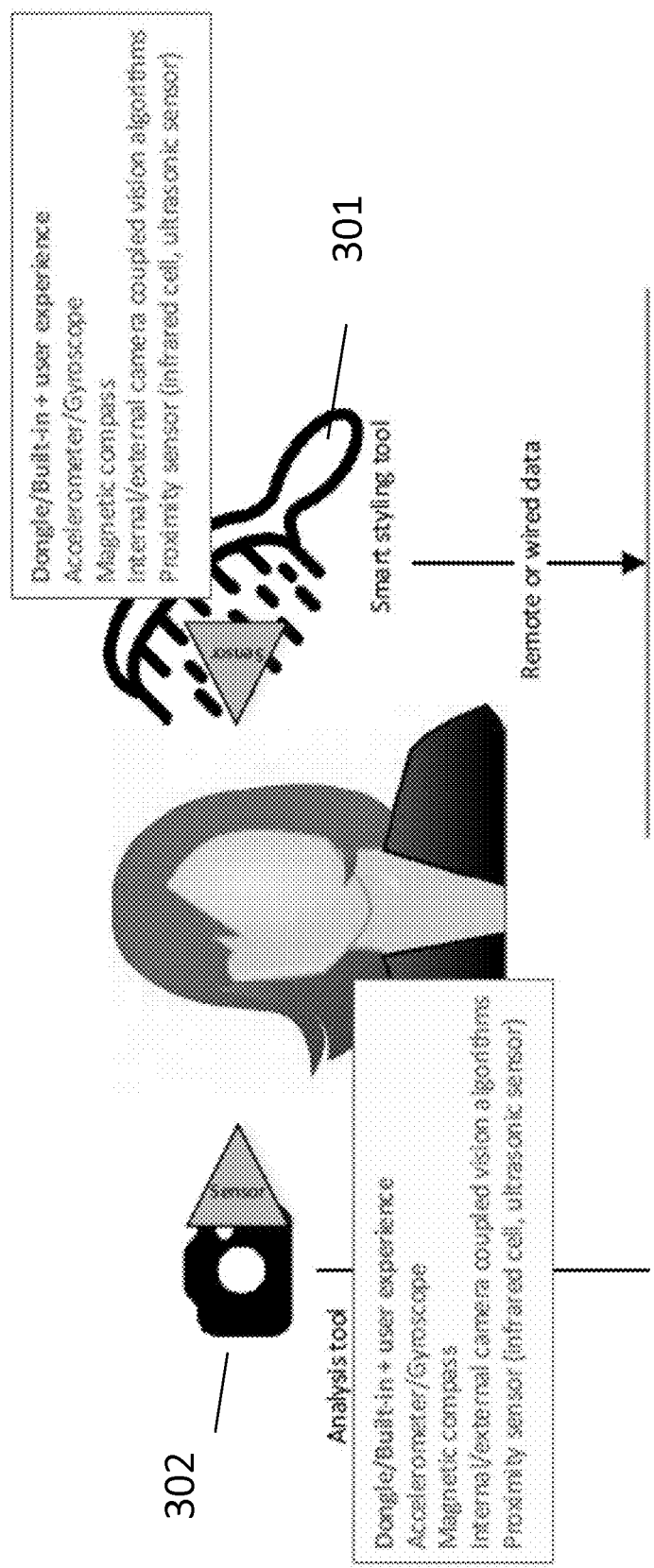
FIG. 3 shows an overview of the sensing component according to an embodiment.

FIG. 3 shows an overview of the sensing component 201 according to the above system 200. The sensing component includes a styling tool 301, which is depicted as a hairbrush with a sensor. However, it may be any number of styling tools, such as a hair dryer, a flat iron, or the like. The sensor may be a sensor for detecting a condition of a user's hair, such as the type of sensors shown in FIG. 1, which include a hair humidity sensor and/or a temperature sensor. The sensor may also be an optical sensor for detecting damage to the hair up close, or even an audio sensor for detecting a condition of the hair based sound when the brush is applied. The sensor may be a proximity sensor, such as an infrared cell or ultrasonic sensor. The proximity sensor is used to measure the distance between the device/sensor and execute the appropriate action. For example, a hair dryer should not blow too warm hair when the user's head is too close to the hair dryer exhaust. On the contrary the device shall detect when the sensors are in a good range to make a relevant measurement of the skin and/or hair.

For detecting motion or a spatial position or change in spatial position, the hairbrush may include an accelerometer/gyroscope or a magnetic compass, as known in the art.

The sensing component may alternatively also include a separate sensor 302. The sensor 302 may include similar sensor as are contained in the styling tool, while optionally including a camera that can capture images of the environment and perform image recognition. The image recognition may be used to detect the presence and position of the user in relation to the styling tool.

The sensor 302 may also detect specific signals being transmitted from the styling tool, which may allow the sensor 302 to detect the specific position of the styling tool in relation to the position of the sensor. If the user also wears a wearable sensor in a predetermined position in the area of the head (such as in the form a necklace or an adhesive sensor that attaches to the user's face), then the sensor 302 may further detect the spatial position of the user in relation to the sensor 302.

If there is no optional sensor 302, then all of the sensing hardware is considered to be "on-board" the styling tool.

Figure 4A:
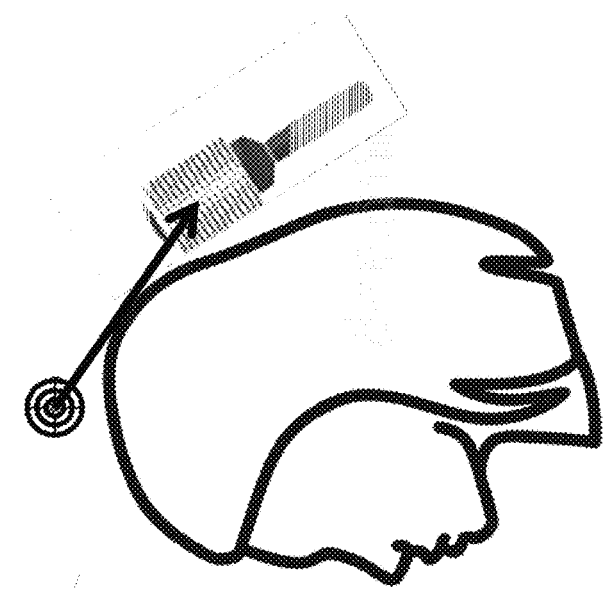
FIGS. 4A, 4B and 4C show an example of how the motion and spatial position of a device may be tracked in an "on-board" example.
Figure 4B:
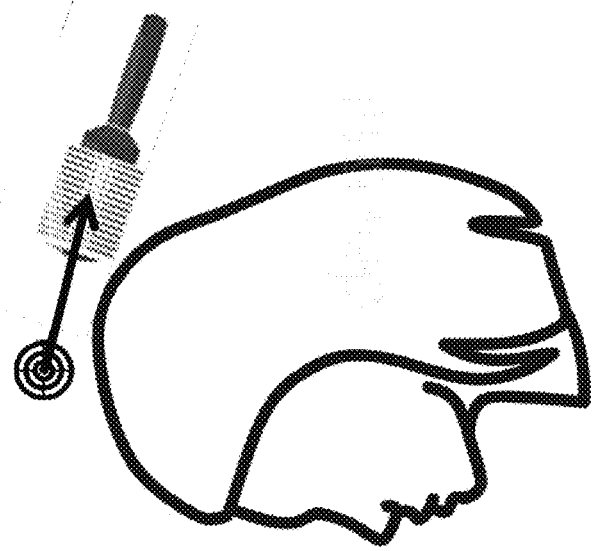
Figure 4C:
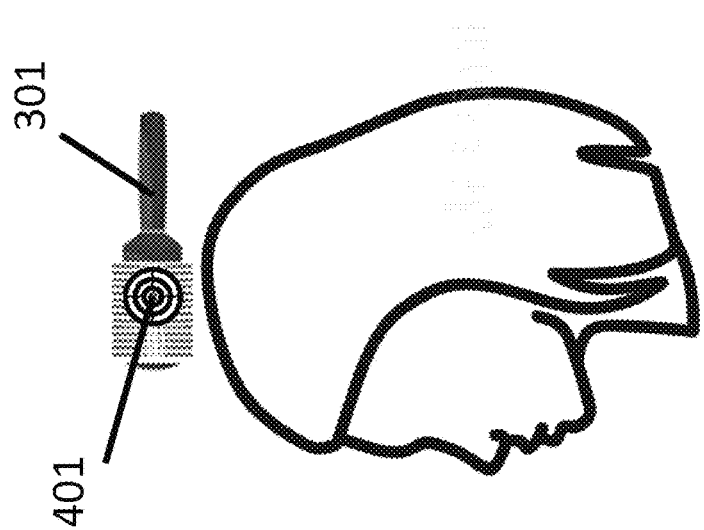

301. FIG. 4 shows an example of how the motion and spatial position of the styling tool 301 may be tracked in the "on-board" example. In this example, the styling tool 301 may include a motion detector such as described above, which can detect the change in position from an initial position 401 at Time=0, such as shown in FIG. 4(A). When the hair brush is moved to a second position at Time=1, such as shown in FIG. 4(B), the spatial difference, based on the movement detected by, for example, an accelerometer/gyroscope/magnetic compass, between the initial position the second position can be detected. Similarly, if the styling tool 301 is moved to a third position at Time=2, then the spatial difference can again be determined from the initial position (or alternatively from the second position).

In the example described above, the initial position 401 of the styling tool 301 is a predetermined position above the top of the head while the brush is held straight. The user may push a button on the styling tool at Time=0 to start the process, and the position of the styling tool at that moment will be considered to be at a predictable origin point in relation to the user's head to the use of the predetermined position. The predetermine position 401 is not limited to the one shown in FIG. 4 and any predetermined position may be used, but it is preferable that is easy for the user to recreate in a predictable location in relation to the user's head.

Figure 5:
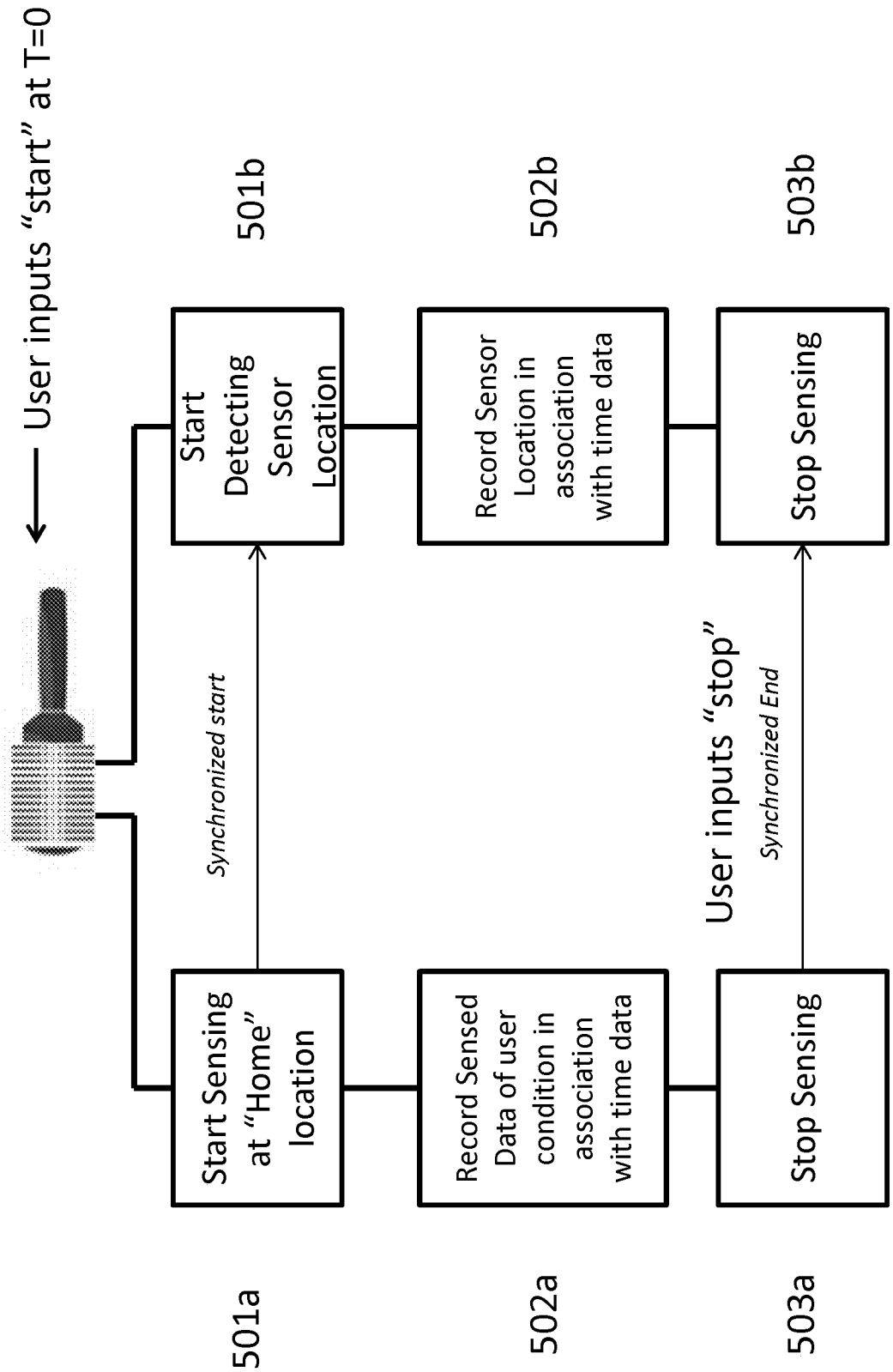
FIG. 5 shows a process performed at the device according to the "on-board" example in an embodiment.

FIG. 5 shows a process performed at the styling tool 301 according to the "on-board" example described above. As noted above, the user may input a "start" input when the styling tool is in the initial position at Time=0. At this time, at step 501a, one or more conditions are detected (such as humidity, temperature, hair damage) by a sensor on the styling tool. In parallel, at step 501b, the location detector described above which detects the approximate spatial position/location of the styling tool, and more specifically, the spatial position of the sensor, starts the detecting the location. At step 502a and 502b, the sensor and the location detector continue to operate in parallel, recording their respective detected data in association with the same synchronized time data. Finally, at step 503a and 503b, the sensor and location data stop their operations at the same synchronized timing in response to a "stop" input provided by the user.

Figure 6B:
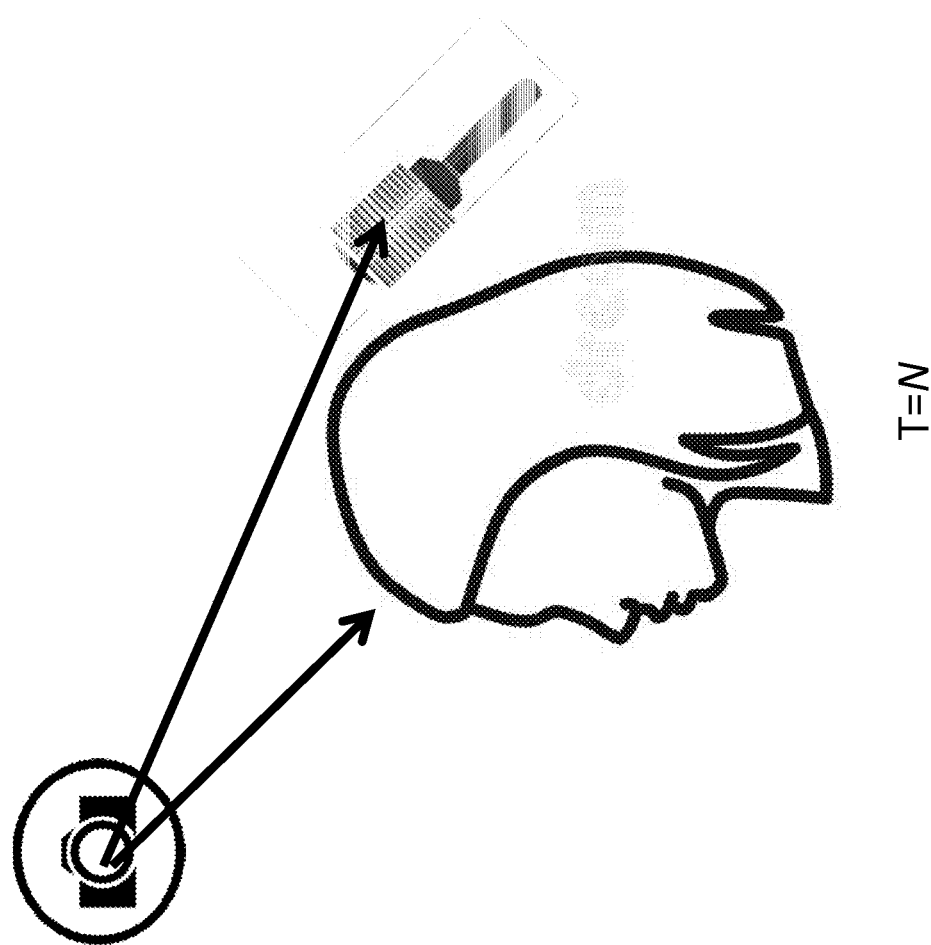
FIGS. 6A and 6B show an example where a separate sensor is utilized according to an embodiment.
Figure 6A:
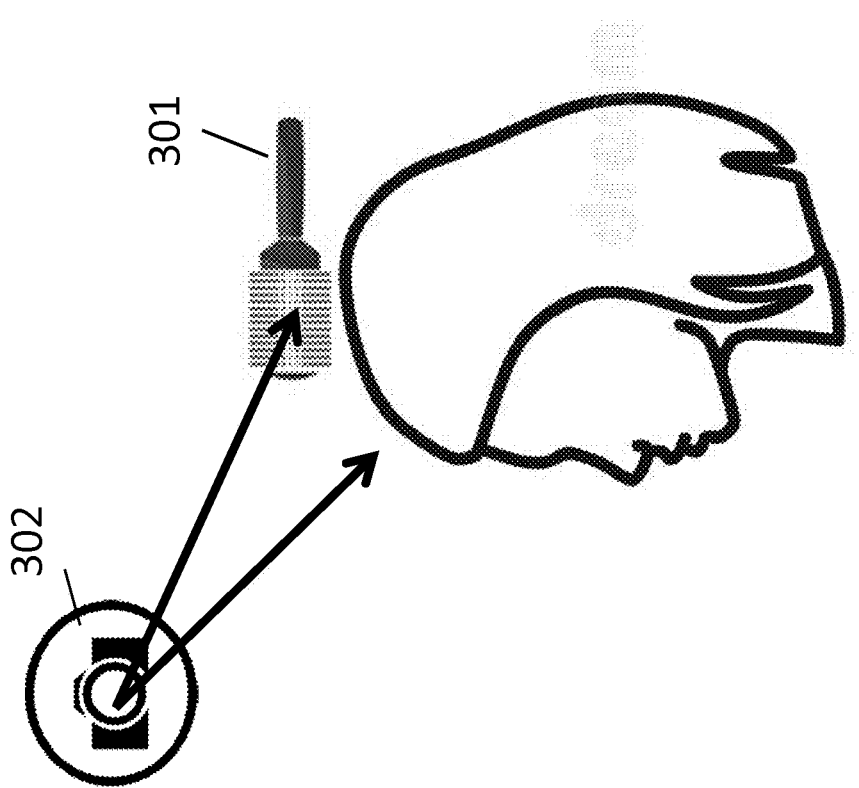

While FIGS. 4 and 5 showed the "on-board" example, FIG. 6 shows an example where the separate sensor 302 is utilized. Similar to the example of FIG. 4, at Time=0, the styling tool may be placed in the initial position while the sensor is in a fixed position nearby. At Time=0, the sensor 302 detects the position of both the styling tool and the user's head in relation to the sensor 302 based on one of the techniques described above. As shown in FIG. 6(B), at any time N thereafter, the sensor 302 detects the new location of the styling tool in relation to the user.

Figure 7:
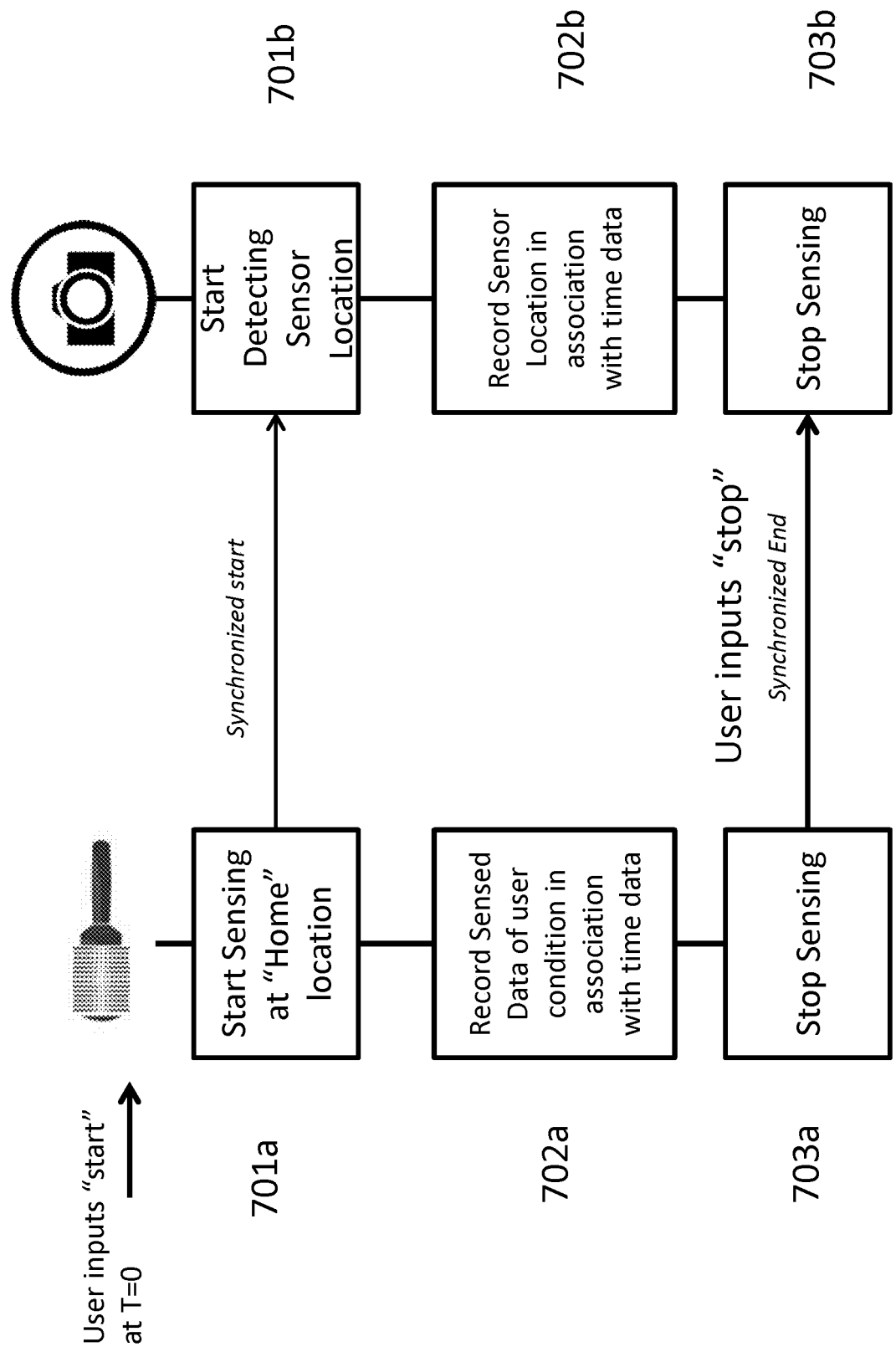
FIG. 7 shows a process performed between a device and a sensor according to an embodiment.

FIG. 7 shows a process performed between the styling tool 301 and the sensor 302 similar to the process shown in FIG. 5 above. The user may input a "start" input when the styling tool is in the initial position at Time=0. At this time, at step 701a, the styling tool may transmit a "start" signal to the sensor 302. Therefore, the styling tool proceeds to use a sensor as described above to sense one or more conditions (such as humidity, temperature, hair damage). In parallel, at step 701b, the sensor 302 detects the approximate spatial position/location of the styling tool. At step 702a and 702b, the sensor and the location detector continue to operate in parallel, recording their respective detected data in association with the same synchronized time data. Finally, at step 703a and 703b, the sensor and location data stop their operations at the same synchronized timing in response to a "stop" input provided by the user at the styling tool 301, which may result in a "stop" signal being transmitted to the sensor 302.

Figure 8:
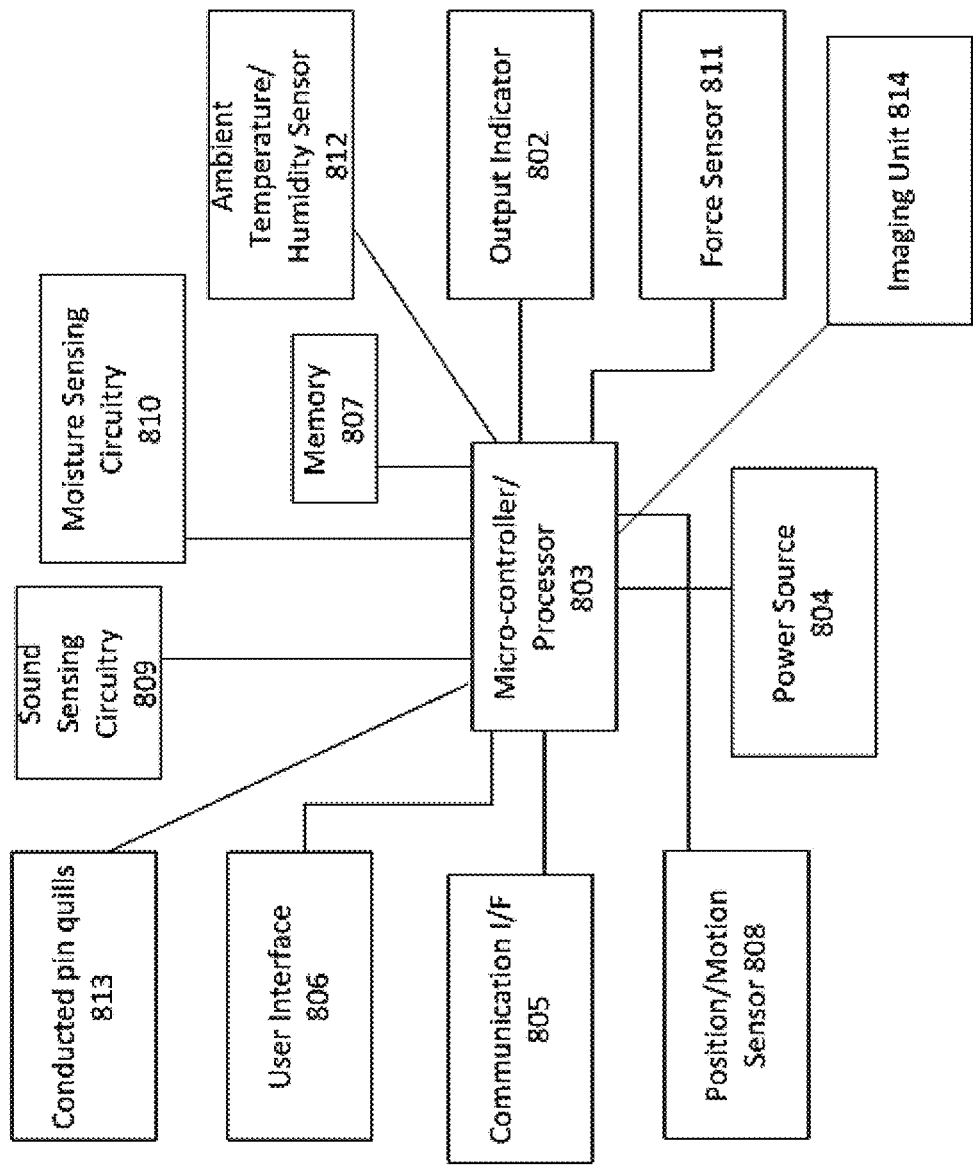
FIG. 8 shows a diagram of the electrical block diagram of the hardware components of a device according to an embodiment.

FIG. 8 shows a diagram of the electrical block diagram of the hardware components of the styling tool 301, when the styling tool 301 is a hairbrush according to an embodiment. The hairbrush includes a micro-controller/processor 803, a power source 804, a communication interface 805, a user interface 806, a memory 807.

The hairbrush may also include sound sensing circuitry 809, which may include a microphone to detect the dryness of the user's hair based on day-to-day energy and spectral sound variation.

The hairbrush may also include moisture sensing circuitry 811. This circuitry may be similar to that described in U.S. application Ser. No. 13/112,533 (US Pub. No. 2012/0291797A1), incorporated herein by reference. Alternatively, the moisture sensing circuitry may rely on a hall-effect sensor which detects changes in a magnetic field, such changes being sensitive to a moisture level.

The hairbrush may also include a force sensor 811, which may be in the form of a load cell disposed between the head and handle.

The hairbrush may also include an ambient temperature/humidity sensor 812, discussed above, that detects the local temperature or humidity near the hairbrush.

Additionally, the hairbrush may include conducted pin quills 813 embedded in the hairbrush for detecting if the hair is wet or dry, or for detecting contact with the hair of the user.

The hairbrush may also include an imaging unit 814, which may be a camera disposed on an outer surface of the brush which faces the users' head or hair while the user is using the hairbrush. The imaging unit may optionally have a thermal imaging capability for sensing thermal characteristics of the user's hair. The imaging unit may also be equipped with a lighting unit (such as an LED light) to aid in the imaging process.

In an embodiment, the hair dryer includes a position/motion sensor 808 that can detect an orientation of the hair dryer too as it is being held by the user, and it may also detect movements and motion paths of the hair dryer as well. In an embodiment, the position/motion sensor is at least one of or a combination of a geomagnetic sensor and an acceleration sensor. For example, a 3-axis geomagnetic sensor ascertains the direction of geomagnetism, or in other words a geomagnetic vector Vt, given the current orientation of (the housing of) the styling tool housing the 3-axis geomagnetic sensor. A 3-axis acceleration sensor ascertains the direction of gravity, or in other words a gravity vector G, given the current orientation of (the housing of) the styling tool housing the 3-axis acceleration sensor in a still state. The gravity vector G matches the downward vertical direction. The gravity vector G likewise may be decomposed into Xs, Ys, and Zs axis components.

Alternatively, or additionally, a gyroscope may be used which is a sensor that detects angular velocity about the three axes Xs, Zs, and Ys (roll, pitch, and yaw), and is able to detect the rotation of an object. In addition, the geomagnetic sensor is able to ascertain the heading in which the object faces, based on a geomagnetic vector as discussed earlier.

While the example of the styling tool 301 above is described as a hairbrush, the styling tool may be any other type of styling tool or personal appliance that is configured to sense a condition or characteristic of the user, such as a flat iron, hair dryer, comb, facial massager, or the liker.

Figure 9:
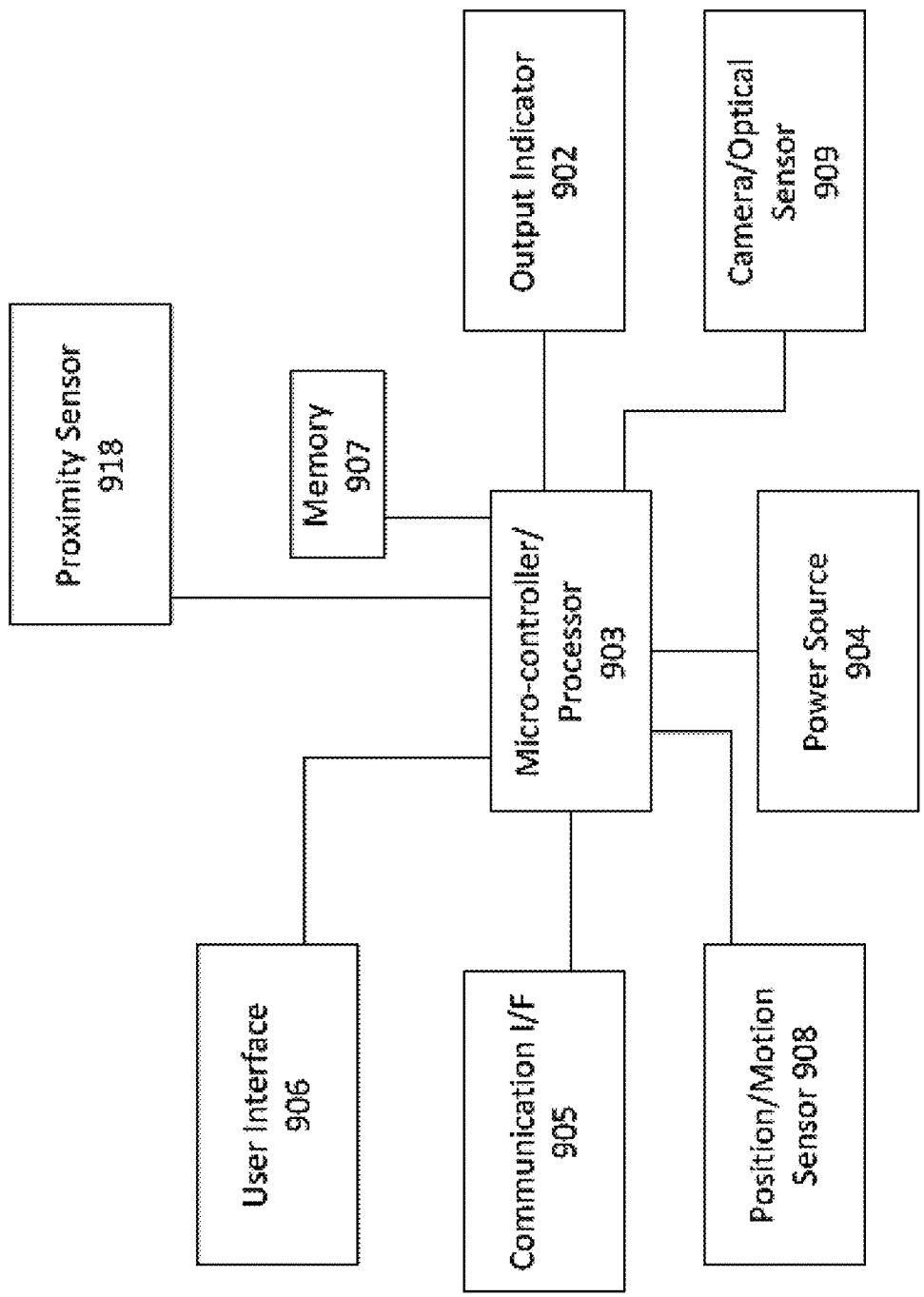
FIG. 9 shows a diagram of the electrical block diagram of the hardware components of the sensor according to an embodiment.

FIG. 9 shows a diagram of the electrical block diagram of the hardware components of the sensor 302 according to an embodiment. The power from the power source 904 is controlled by the micro-controller/processor 903.

The sensor 302 may communicate data with another device through a communication interface 905.

The sensor 302 may include a user interface 906, which may be in the form of input buttons on the housing of the tool, or it may be in the form of a contact-sensitive display, such as a capacitive or resistive touch screen display.

In an embodiment, the sensor 302 includes output indicator 902 which may be in the form of lights (such as LED lights), an indicator on a touch screen, or an audible output through a speaker.

In an embodiment, the sensor 302 includes a memory 907 that stores software for controlling the hair dryer, or for storing user data or other information.

The sensor 302 may also include proximity sensor 918, which may detect the present of external objects or devices, and may be an optical sensor, such as an infrared sensor, which is understood in the art. However other examples may be employed as well, such as a capacitive, ultrasonic, or Doppler sensors.

The sensor 302 may include a motion/position sensor 908, which is similar to the position/motion sensor 808 included in the styling tool and described above.

The sensor 302 includes image sensor 909, such as a charge coupled device (CCD) and a complementary metal oxide semiconductor (CMOS) that generates a captured image.

In the examples described above, both the styling tool 301 and the sensor 302 include a communication interface (I/F) that can include circuitry and hardware for communication with a client device 120. The communication interface 205 may include a network controller such as BCM43342 Wi-Fi, Frequency Modulation, and Bluetooth combo chip from Broadcom, for interfacing with a network. The hardware can be designed for reduced size. For example, the processor 203 may be a CPU as understood in the art. For example, the processor may be an APL0778 from Apple Inc., or may be other processor types that would be recognized by one of ordinary skill in the art. Alternatively, the CPU may be implemented on an FPGA, ASIC, PLD or using discrete logic circuits, as one of ordinary skill in the art would recognize. Further, the CPU may be implemented as multiple processors cooperatively working in parallel to perform the instructions of the inventive processes described above.

Figure 10:
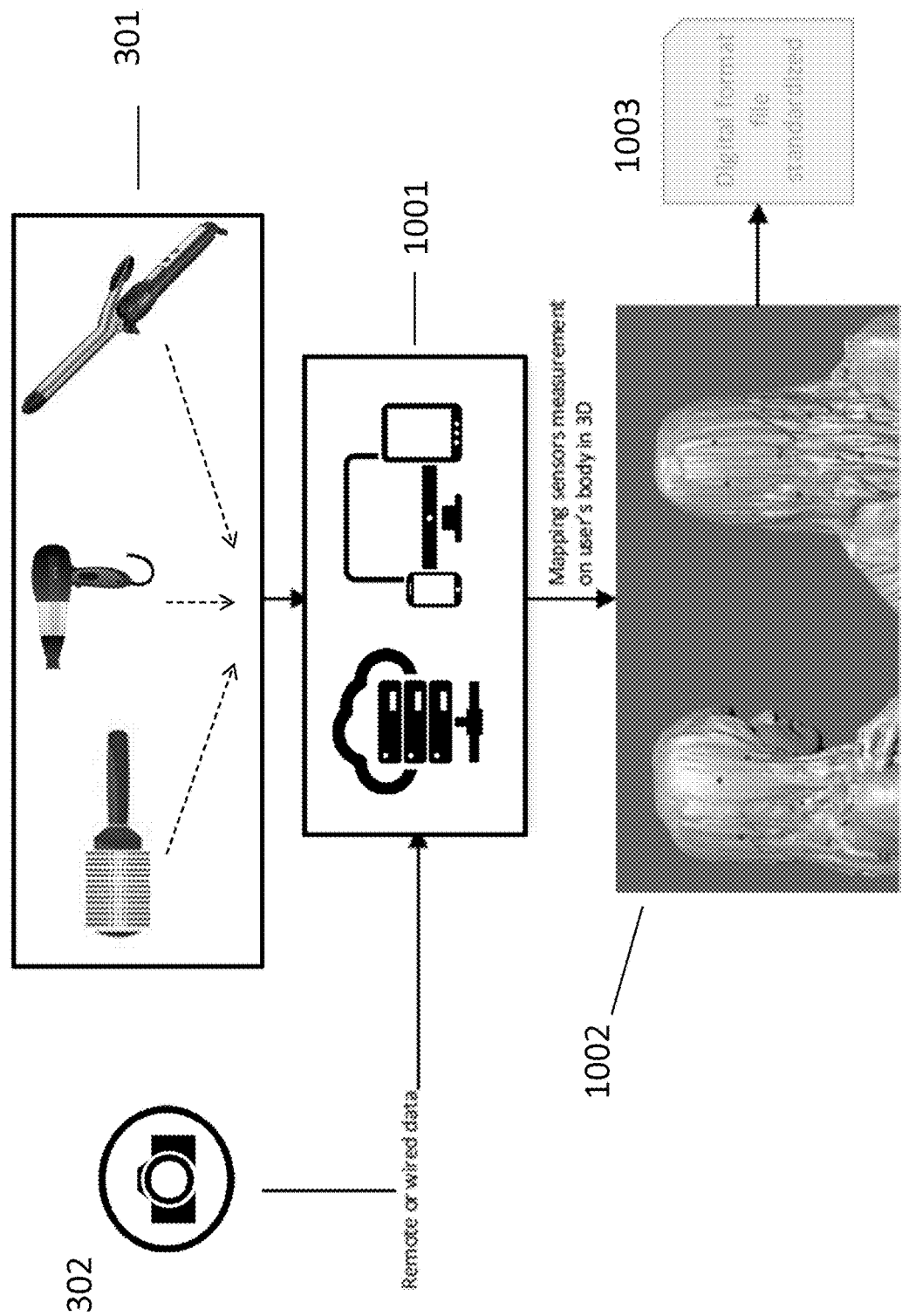
FIG. 10 shows overview of the 3D reconstruction component according to an embodiment.

FIG. 10 shows overview of the 3D reconstruction component 202 shown above in FIG. 2. In the 3D reconstruction component, the styling tool(s) 301 provide their sensed condition data to an information system 1001, which may be in the form of a cloud server, computer, or portable device (smartphone, tablet, etc.). Additionally, the sensor 302 may also provide its recorded data related to the detected position of the objects in the environment to the information system 1001.

The information system 1001 can then map the sensed data to a virtual 3D user image as depicted in 1002. The virtual 3D user image 1002 may be a virtual 3D image of a predetermined representative person image based on the characteristics of the user, such as gender, height, weight, hair length, hair type, and others. It is not necessary to have a virtual 3D image that is an exact replica of the actual user.

The data provided by the location tracker of either the styling tool or the sensor 302 is in the form of three-dimensional coordinates with respect to an origin that coincides with the origin of the virtual 3D image depicted in 1002. In the process of reconstruction, the system 1001 may directly map a coordinate of a sensed condition (such as hair damage) received from the styling tool to the virtual 3D image environment. However, since this may not result in a perfect mapping to the surface of the hair shown in the virtual 3D image, the system 1001 is configure to apply an offset if necessary to map a coordinate of the sensed condition to the most appropriate position on the surface of the hair of the virtual 3D user image. This offset may be applied based on adjusting the coordinate of the sensed condition to the nearest spot on the hair surface of the virtual 3D user image. The system 1001 may be configured to use machine learning techniques to optimize the application of the offset based on receiving feedback when using training samples as necessary.

Figure 11:
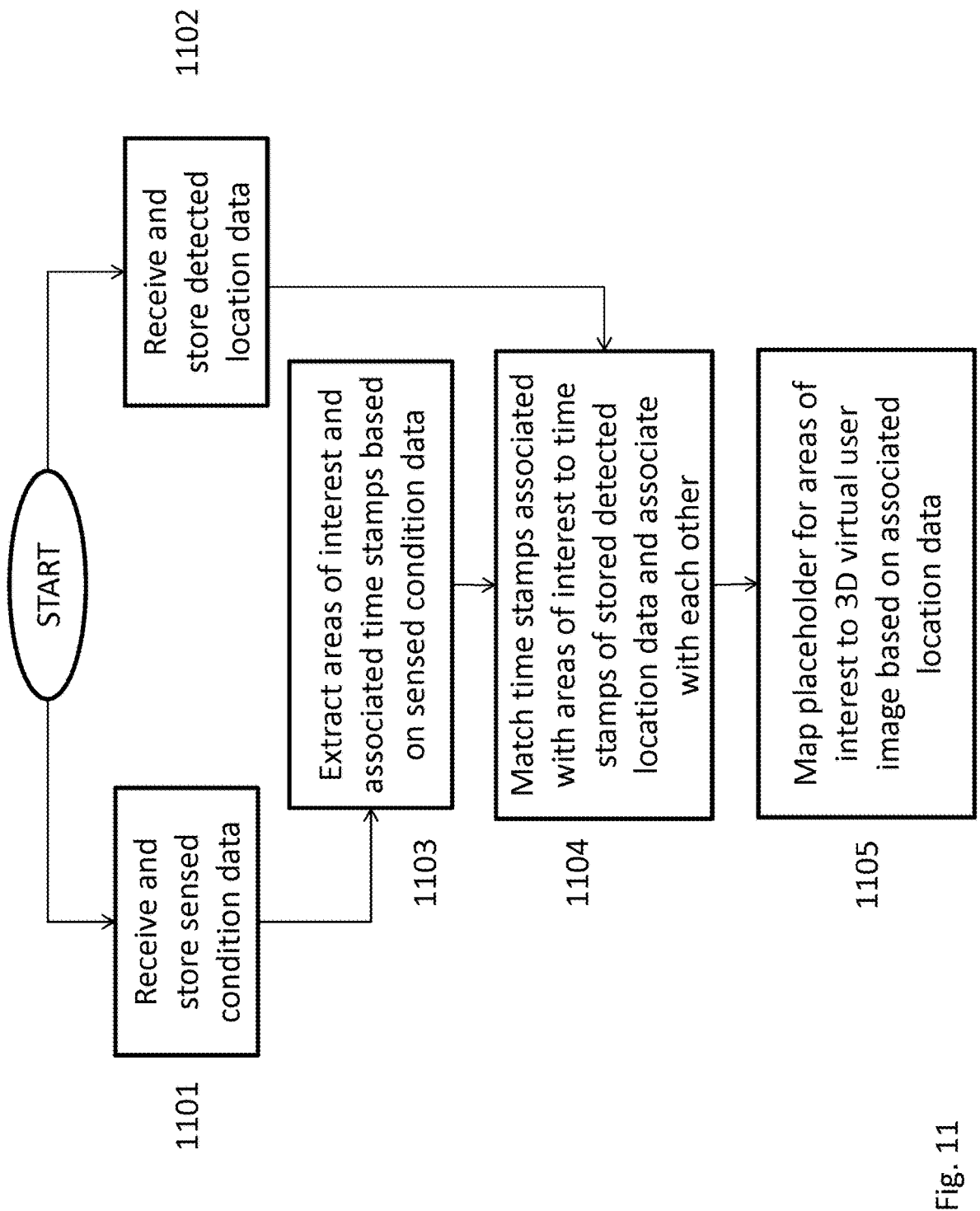
FIG. 11 shows a process performed by the system to map a coordinate of the sensed condition to the virtual 3D user image according to an embodiment.

FIG. 11 shows a process performed by the system 1001 to map a coordinate of the sensed condition to the virtual 3D user image. In step 1101, the system receives and stores sensed condition data received from the styling tool 301. In step 1102, the system receives and stores detected location data, which may be provided by either the styling tool 301 or a sensor 302 as described above.

In step 1103, the system analyzes and extracts areas of interest (such as hair damage) and associated time stamps based on sensed condition data. This step will be different based on the type of sensor that is involved. For instance, in detecting damaged hair, a moisture sensor reading that detects an above threshold of dryness in the hair may trigger an extraction of an area of interest. If an optical or image sensor is being used, then an image recognition of split ends may trigger an extraction of an area of interest. Alternatively, if a sound sensor is used, the area of interest may be a location where a sound in the brushing of the hair triggers a certain frequency threshold which is characteristic of overly dry or damaged hair.

In step 1104, the system 1001 extracts stored location data which has a time stamp that matches a time stamp of an area of interest, and the location data and the area of interest are associated with each other.

In step 1105, the system "maps" the area of interest to the 3D virtual user image based on association of the area of interest to the location data, which as discussed above is in the form of 3D coordinate data. In reality, this "mapping" involves storing the area of interest in association with a displayed feature on the virtual 3D image (such as a portion of the user's hair). The system 1001 may include a display which shows the results of the mapping, which may involve displaying a placeholder indicator or image at the mapped location on the 3D avatar as shown in 1002.

When the mapping is completed, the system is configured to create a digital file that is format standardized as shown in 1003 in FIG. 10.

FIG. 12 shows examples of different digital file formats created based on the 3D reconstruction algorithm. The file format shown in FIG. 12 represents data collected from a single device, such as the hair dryer in this example. The file format includes a multiple fields, such as a timestamp field 1211, accelerometer coordinate fields 1212, gyroscope fields 1213, magnetic compass fields 1214, sensor measurement fields 1214, 3D coordinate fields 1215, 3D normal fields 1216, and a field 1217 for indicating if entries corresponding to a particular timestamp represent an area of interest to be displayed. The data in the digital file may be filtered or compressed as necessary to reduce storage space.

Figure 13:
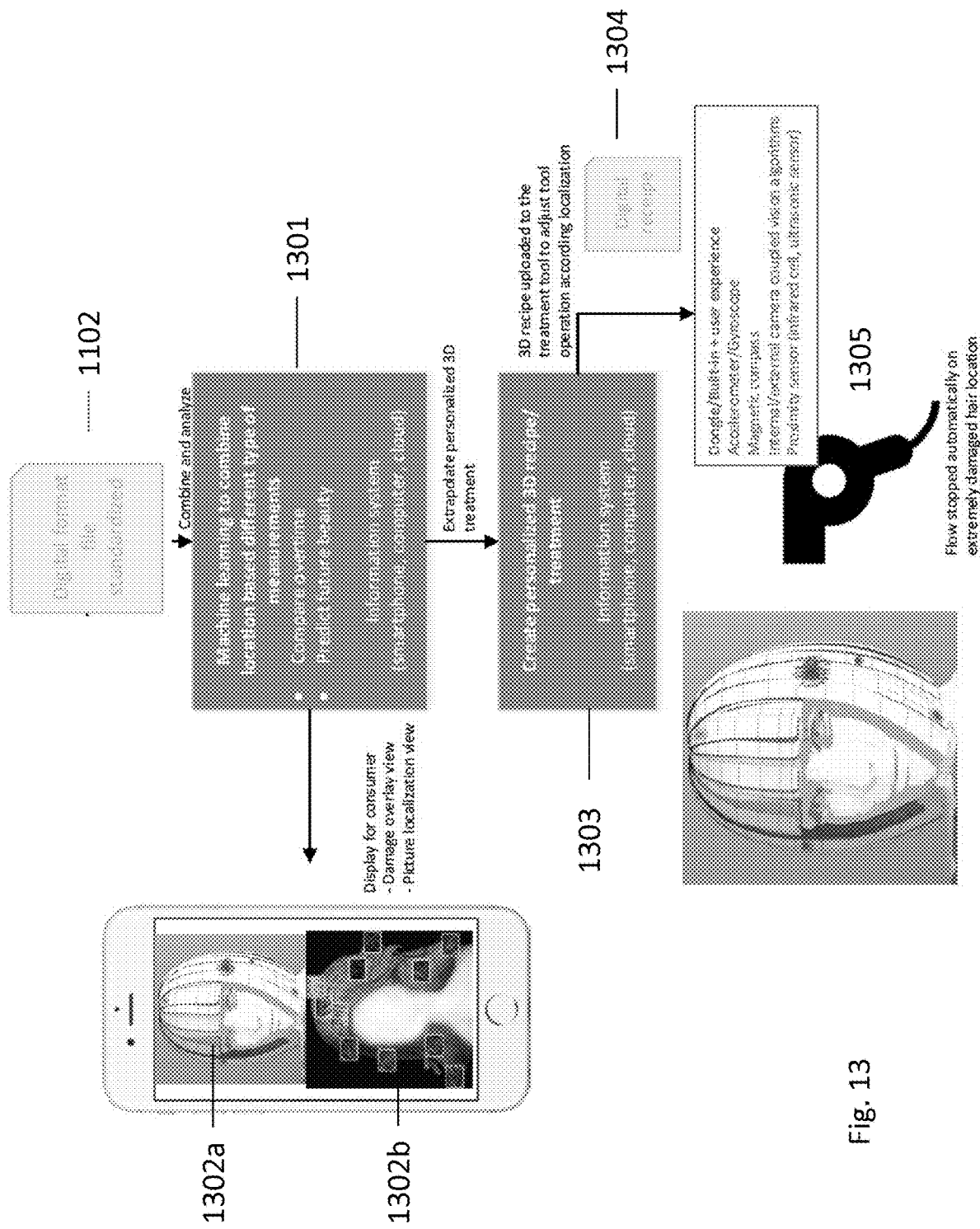
FIG. 13 shows an overview of the feedback component according to an embodiment.

FIG. 13 shows an overview of the feedback component 203 shown above in FIG. 2. As shown in FIG. 13,the digital file 1003 is provided to a system 1301, which may be the same system as system 1001, or it may be a different system, device, or even the personal device of the user (such as a smartphone).

The system 1301 is configured to use machine learning to combine the sensed data for areas of interest for different types of measurements. This may involve comparing sensed data over time and predicting the future health and beauty of the user.

For instance, if the sensed condition is grey hairs, the system 1301 is configured to determine if a pattern of onset of the grey hairs is occurring based on comparing the sensed data over time. Such a determination can be used to generate 3D image data which may depict the predicted results on the 3D virtual user image. These results may be transmitted o the user to be displayed on user device, such as a smartphone, as shown in step 1302

As show in step 1302a, the display of the results at the user's smartphone may include a "damage overlay view" which shows an indicator at an area of interest on a 3D virtual user. As shown in 1302b, the display may include a "picture localization view" which actually shows or depicts a zoomed in area of the area of interest on the virtual 3D user image. For instance, if the area of interest is damaged hair, then the picture localization will show an actual representative image of damaged hair at the spot on the user where the area of interest resides.

Based on the detected areas of interest and the predicted health and beauty of the user, a personalized 3D recipe or treatment may be generated at 1303 by the information system.

For instance, a digital recipe may be generated by the system to treat the user's hair with a styling tool (such as a hair dryer) in a way to prevent further damage to the user's hair. The digital recipe may be transmitted to the hair dryer itself, and the hair dryer may adjust the temperature and/or the shape and/or speed of the air flow, by for example, adjusting the resistance of the heating element in the hair dryer, adjusting the fan speed, and/or adjusting the shape of the mechanical elements which control the air flow shape.

As mentioned above, co-pending U.S. application Ser. No. 15/721,286, incorporated herein by reference, describes a hair dryer that may adjust its settings based on feedback of conditions directly from a hair brush. In this case, the digital recipe described above may be transmitted directly to such a hair dryer according to an embodiment.

Figure 14:
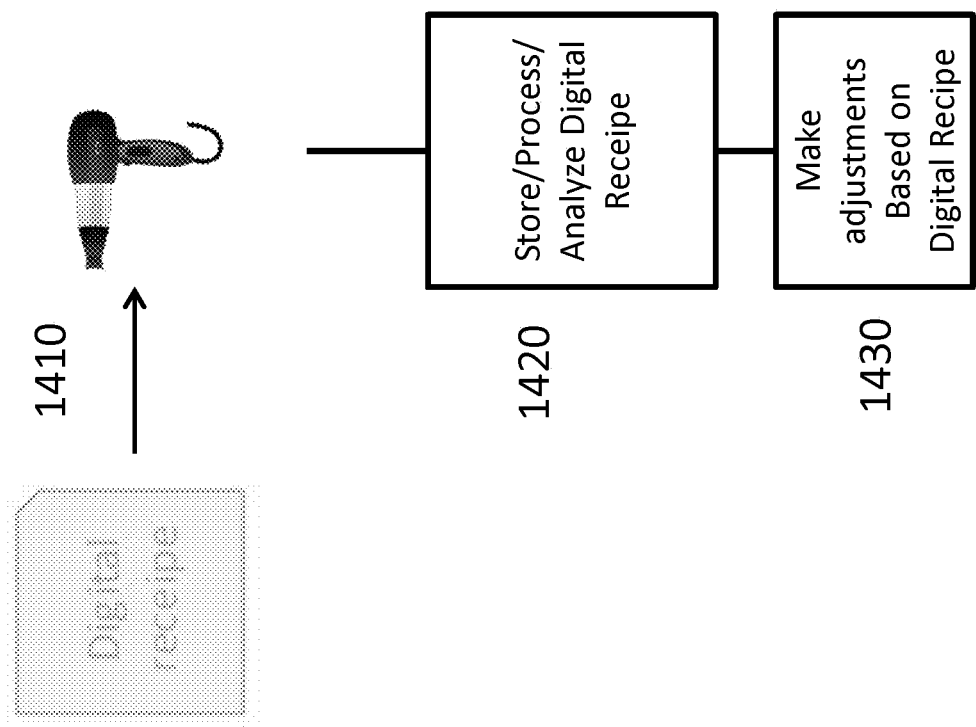
FIG. 14 shows an algorithm that may be performed by the device according to an embodiment.

FIG. 14 shows an algorithm that may be performed by the hair dryer according to an embodiment. In step 1410, the hair dryer receives the digital recipe. In step 1420, the digital recipe is processed or analyzed. In step 1430, the hair dryer performs adjustment of the settings on the hair dryer based on the processed/analyzed digital recipe.

Figure 15:
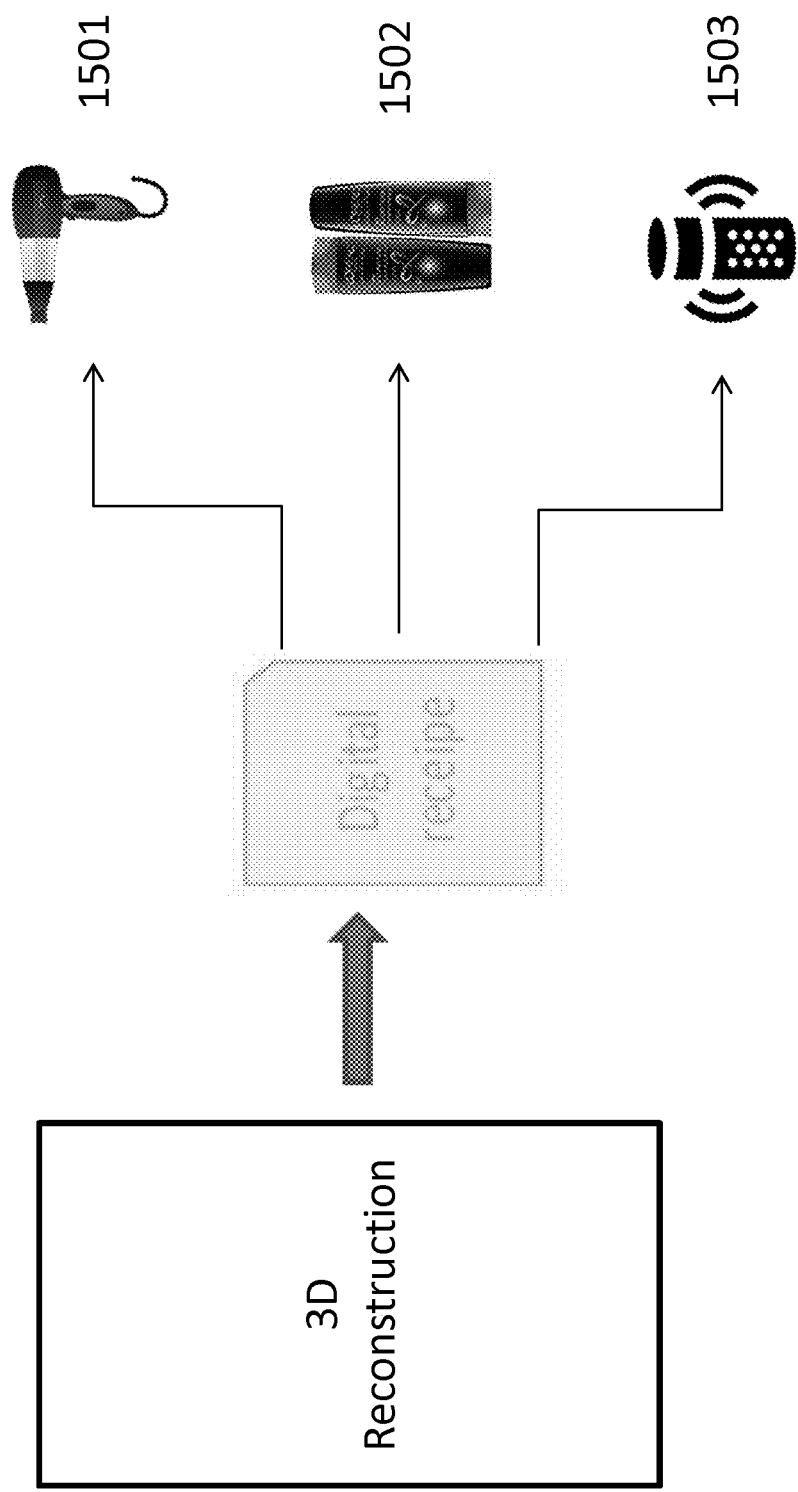
FIG. 15 shows uses of the digital recipe when the device is a hair styling tool according to an embodiment.

While FIG. 14 shows that the digital recipe may be used to cause adjustments to a hair dryer device (or other styling tool), the digital recipe may be utilized for a variety of benefits as shown in FIG. 15. For instance, the digital recipe may be simultaneously or alternatively used as an input for adjustments or a regime when using a hair dryer/styling tool 1501 as discussed above, a recommendation for particular one or more hair products 1502; and it also may be output to a virtual assistant device 1503 which may audibly provide information to a user as appropriate.

Furthermore, while the above examples are directed to an example of a hair dryer, a hair styling tool, or a hair brush, the present application is not limited to this example, and others may be used.

Figure 16:
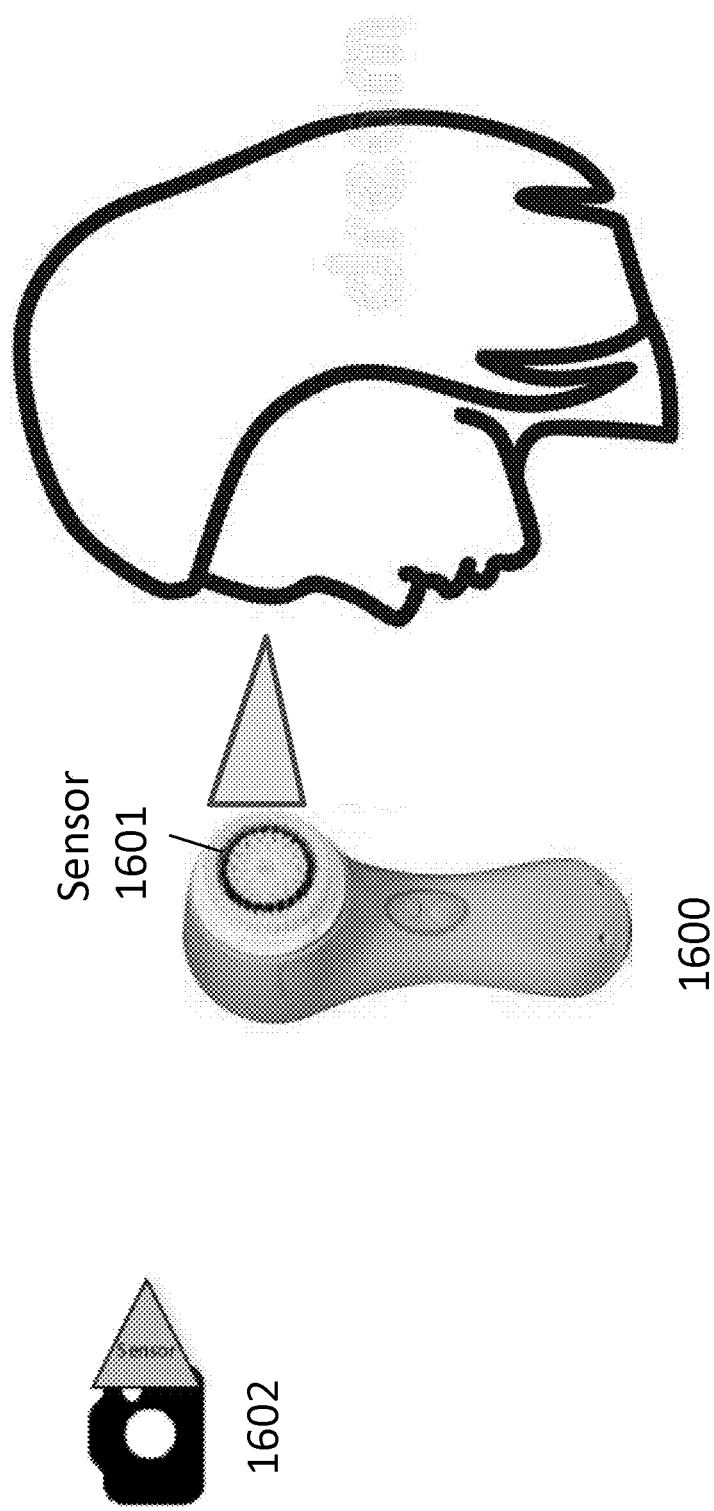
FIG. 16 shows examples of the device being sonic vibrating brush device which act upon a user's skin according to an embodiment.

For instance, FIG. 16 shows examples of sonic vibrating brush device 1600 which act upon a user's skin. The brush device may include a sensor 1601, similar to the sensor 301 described above, disposed on the front face of the device for capturing images, sounds, texture, or dryness of the face of the user. Additionally or alternatively, an external sensor 1602 may be provided which is similar to the sensor 302 described above.

The areas of interest may include detecting any number of skin conditions such as wrinkles, crow's feet, acne, dry skin, black heads, or others.

Figure 17:
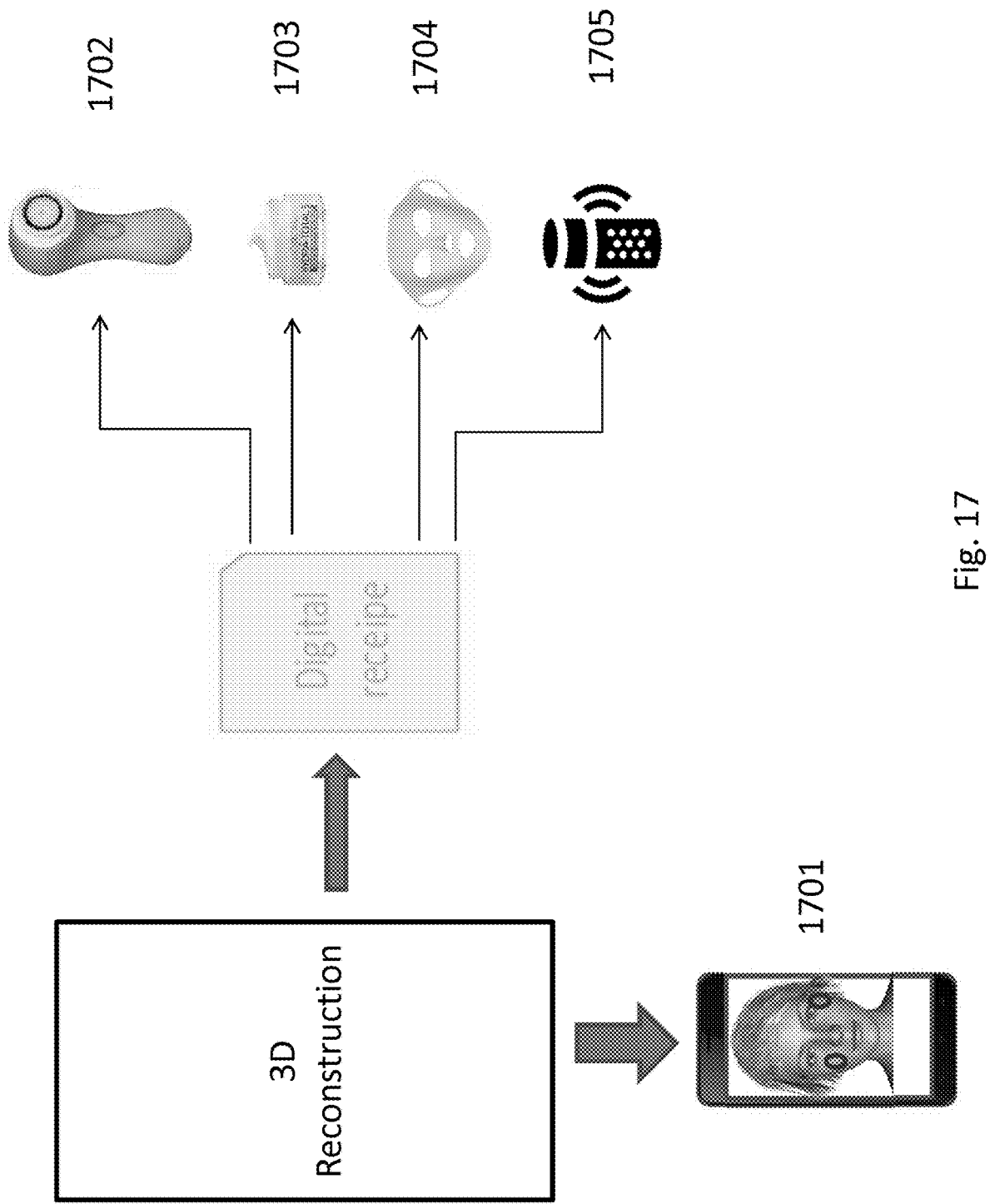
FIG. 17 shows uses of the 3D reconstruction and digital recipe when the device is a hair styling tool according to an embodiment.

The results of the 3D reconstruction for the facial region are analogous to the results of the hair region as described above. For instance, as shown in FIG. 17, the 3D reconstruction may be output to a display on a smartphone 1701, which highlights the sensed condition areas on an avatar of the user. Alternatively, the 3D reconstruction may be used to create a digital recipe, which may be output for (i) adjusting or controlling a facial skincare device 1702, (ii) recommending skin care products 1703, (iii) being used to create a customized facial mask 1704, or (iii) for outputting to a virtual assistant device 1705 which may audibly provide information to a user as appropriate.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:
1. A system comprising:
a device that includes at least one sensor configured to sense a condition of a body part of a user;
a location tracker that is configured track a location of the device in space; and
processing circuitry configured to
receive an input that a session has started based on the device receiving an input from the user while the user is holding the device at a desired origin point in space relative to the body part of the user, wherein the at least one sensor starts to sense the condition and the location tracker starts to track the location of the device in space at a time of starting the session, such that the at least one sensor and the location tracker operate in parallel based on synchronized time data from the time of starting the session;
receive information of a specific sensed condition of the body part of the user detected by the at least one sensor of the device during the session,
receive information of a tracked location of the device in space from the location tracker during the session, when the device is within a field of view of the location tracker,
associate a specific time when the specific sensed condition is detected with a location of the device in space at the specific time, and
determine a location on the body part in a three-dimensional virtual environment where the specific sensed condition occurs based on the associated specific time and location of the device,
wherein the processing circuitry is configured to generate a digital file which associates the specific sensed condition to the three-dimensional virtual environment, and output the digital file to a display device for generating a display of the three-dimensional virtual environment, wherein the display of the three-dimensional virtual environment depicts the specific sensed condition on a three-dimensional representation of the user.

2. The system according to claim 1, the digital file having a predetermined file format.

3. The system according to claim 2, wherein the predetermined file format includes at least one of a timestamp field, accelerometer coordinate fields, gyroscope fields, magnetic compass fields, sensor measurement fields, 3D coordinate fields, 3D normal fields, and a field for indicating if entries corresponding to a particular timestamp represent an area of interest to be displayed.

4. The system according to claim 2, wherein the processing circuitry is configured to generate a digital recipe based on the digital file for controlling a device to treat the sensed condition, and transmit the digital recipe to the device.

5. A method, implemented by a system that includes a device that includes at least one sensor configured to sense a condition of a body part of a user, a location tracker that is configured track a location of the device in space, the method comprising:

receive an input that a session has started based on the device receiving an input from the user while the user is holding the device at a desired origin point in space relative to the body part of the user, wherein the at least one sensor starts to sense the condition and the location tracker starts to track the location of the device in space at a time of starting the session, such that the at least one sensor and the location tracker operate in parallel based on synchronized time data from the time of starting the session;

receiving information of a specific sensed condition of the body part of the user detected by the at least one sensor of the device during the session;

receiving information of a tracked location of the device in space from the location tracker during the session, when the device is within a field of view of the location tracker;

associating a specific time when the specific sensed condition is detected with a location of the device in space at the specific time; and determining a location on the body part in a three-dimensional virtual environment where the specific sensed condition occurs based on the associated specific time and location of the device the method further comprising:

generating a digital file which associates the specific sensed condition to the three-dimensional virtual environment, and outputting the digital file to a display device for generating a display of the three-dimensional virtual environment, wherein the display of the three-dimensional virtual environment depicts the specific sensed condition on a three-dimensional representation of the user.

6. The method according to claim 5, the digital file having a predetermined file format.

7. The method according to claim 6, wherein the predetermined file format includes at least one of a timestamp field, accelerometer coordinate fields, gyroscope fields, magnetic compass fields, sensor measurement fields, 3D coordinate fields, 3D normal fields, and a field for indicating if entries corresponding to a particular timestamp represent an area of interest to be displayed.

8. The method according to claim 6, further comprising generating a digital recipe based on the digital file for controlling a device to treat the sensed condition, and transmit the digital recipe to the device.

* * * * *